(12) United States Patent
Shin et al.

(10) Patent No.: US 10,990,196 B2
(45) Date of Patent: Apr. 27, 2021

(54) SCREEN OUTPUT METHOD AND ELECTRONIC DEVICE SUPPORTING SAME

(71) Applicant: Samsung Electronics Co., Ltd., Gyeonggi-do (KR)

(72) Inventors: Jung Woo Shin, Gyeonggi-do (KR); Ji Young Lee, Seoul (KR); Jeong Won Ko, Seoul (KR); Kuk Hwan Kim, Seoul (KR); Da Hwun Kim, Seoul (KR); Dong Kyun Kim, Seoul (KR); Young Mi Kim, Seoul (KR); Young Seong Kim, Seoul (KR); Myoung Soo Park, Gyeonggi-do (KR); Jung Sik Park, Gyeonggi-do (KR); Jung Hee Yeo, Seoul (KR); Haemi Yoon, Seoul (KR); Kyung Jun Lee, Gyeonggi-do (KR); Hyun Yeul Lee, Seoul (KR)

(73) Assignee: Samsung Electronics Co., Ltd

( * ) Notice: Subject to any disclaimer, the term of this patent is extended or adjusted under 35 U.S.C. 154(b) by 38 days.

(21) Appl. No.: 16/306,763

(22) PCT Filed: Jun. 2, 2017

(86) PCT No.: PCT/KR2017/005782
§ 371 (c)(1),
(2) Date: Dec. 3, 2018

(87) PCT Pub. No.: WO2017/209560
PCT Pub. Date: Dec. 7, 2017

(65) Prior Publication Data
US 2019/0129520 A1 May 2, 2019

(30) Foreign Application Priority Data

Jun. 2, 2016 (KR) .................. 10-2016-0069091

(51) Int. Cl.
*G06F 3/0346* (2013.01)
*G06F 3/14* (2006.01)
(Continued)

(52) U.S. Cl.
CPC ............ *G06F 3/0346* (2013.01); *G06F 3/048* (2013.01); *G06F 3/14* (2013.01); *G06T 7/00* (2013.01); *G06T 7/40* (2013.01); *H04N 5/225* (2013.01)

(58) Field of Classification Search
CPC .......... G06F 3/0346; G06F 3/048; G06F 3/14; H04M 1/72569; G06T 7/00; G06T 7/40; H04N 5/225
See application file for complete search history.

(56) References Cited

U.S. PATENT DOCUMENTS 7,484,176 B2   1/2009   Blattner et al.
7,636,751 B2  12/2009   Weaver et al.
(Continued)

FOREIGN PATENT DOCUMENTS

EP   1 513 330     3/2005
JP   2005151271    6/2005
(Continued)

OTHER PUBLICATIONS

European Search Report dated May 21, 2019 issued in counterpart application No. 17807053.8-1216, 7 pages.
(Continued)

*Primary Examiner* — Jonathan A Boyd
(74) *Attorney, Agent, or Firm* — The Farrell Law Firm, P.C.

(57) ABSTRACT

An electronic device includes a camera module capturing an image, a sensor module recognizing a signal associated with the electronic device or an external object, a first display and a second display, each of which is configured to output
(Continued)

content, a memory, and a processor electrically connected to the camera module, the first display, the second display, and the memory. The processor is configured to determine whether the electronic device enters a first state, to capture a source image by using the camera module, when entering the first state, and to generate a first output image output on the first display or a second output image output on the second display based on the source image.

7 Claims, 13 Drawing Sheets

(51) Int. Cl.
*G06F 3/048* (2013.01)
*G06T 7/40* (2017.01)
*H04N 5/225* (2006.01)
*G06T 7/00* (2017.01)

(56) References Cited

U.S. PATENT DOCUMENTS

| | | | |
|---|---|---|---|
| 7,636,755 B2 | 12/2009 | Blattner et al. | |
| 7,685,237 B1 | 3/2010 | Weaver et al. | |
| 7,689,649 B2 | 3/2010 | Heikes et al. | |
| 7,779,076 B2 | 8/2010 | Heikes et al. | |
| 7,908,554 B1 | 3/2011 | Blattner | |
| 7,913,176 B1 | 3/2011 | Blattner et al. | |
| 8,037,150 B2 | 10/2011 | Weaver et al. | |
| 8,250,144 B2 | 8/2012 | Blattner et al. | |
| 8,402,378 B2 | 3/2013 | Blattner et al. | |
| 8,521,230 B2 | 8/2013 | Matsuo et al. | |
| 8,627,215 B2 | 1/2014 | Blattner et al. | |
| 8,947,627 B2 | 2/2015 | Rappoport et al. | |
| 9,215,095 B2 | 12/2015 | Weaver et al. | |
| 9,256,861 B2 | 2/2016 | Blattner | |
| 9,330,587 B2 | 5/2016 | Jackson et al. | |
| 9,483,859 B2 | 11/2016 | Blattner et al. | |
| 9,543,364 B2 | 1/2017 | Rappoport et al. | |
| 9,806,219 B2 | 10/2017 | Benson et al. | |
| 9,825,103 B2 | 11/2017 | Rappoport et al. | |
| 10,049,644 B2 | 8/2018 | Vukicevic | |
| 2003/0222907 A1 | 12/2003 | Heikes et al. | |
| 2003/0225846 A1 | 12/2003 | Heikes et al. | |
| 2003/0225847 A1 | 12/2003 | Heikes et al. | |
| 2003/0225848 A1 | 12/2003 | Heikes et al. | |
| 2004/0148346 A1 | 7/2004 | Weaver et al. | |
| 2004/0179037 A1 | 9/2004 | Blattner et al. | |
| 2004/0179038 A1 | 9/2004 | Blattner et al. | |
| 2004/0179039 A1 | 9/2004 | Blattner et al. | |
| 2004/0221224 A1 | 11/2004 | Blattner et al. | |
| 2005/0108329 A1 | 5/2005 | Weaver et al. | |
| 2005/0212749 A1* | 9/2005 | Marvit | G06F 3/0346 345/156 |
| 2007/0070076 A1* | 3/2007 | Foxenland | G09G 5/00 345/581 |
| 2007/0113181 A1 | 5/2007 | Blattner et al. | |
| 2007/0168863 A1 | 7/2007 | Blattner et al. | |
| 2009/0158184 A1 | 6/2009 | Blattner et al. | |
| 2010/0169801 A1 | 7/2010 | Blattner et al. | |
| 2010/0174996 A1 | 7/2010 | Heikes et al. | |
| 2011/0111809 A1 | 5/2011 | Matsuo et al. | |
| 2011/0148916 A1 | 6/2011 | Blattner | |
| 2011/0209198 A1 | 8/2011 | Blattner et al. | |
| 2012/0089924 A1 | 4/2012 | Weaver et al. | |
| 2013/0080927 A1 | 3/2013 | Weaver et al. | |
| 2013/0094126 A1 | 4/2013 | Rappoport et al. | |
| 2013/0174052 A1 | 7/2013 | Blattner et al. | |
| 2013/0290446 A1 | 10/2013 | Blattner et al. | |
| 2014/0035893 A1 | 2/2014 | Jackson et al. | |
| 2014/0082198 A1 | 3/2014 | Blattner et al. | |
| 2014/0214989 A1 | 7/2014 | Heikes et al. | |
| 2014/0225131 A1 | 8/2014 | Benson et al. | |
| 2014/0228073 A1* | 8/2014 | Fratti | H04W 4/026 455/556.1 |
| 2015/0138385 A1* | 5/2015 | Kim | H04N 5/23216 348/211.99 |
| 2015/0144934 A1 | 5/2015 | Rappoport et al. | |
| 2015/0279115 A1 | 10/2015 | Vukicevic | |
| 2016/0165003 A1 | 6/2016 | Blattner et al. | |
| 2016/0197859 A1 | 7/2016 | Weaver et al. | |
| 2016/0294742 A1 | 10/2016 | Weaver et al. | |
| 2016/0343160 A1 | 11/2016 | Blattner et al. | |
| 2017/0117336 A1 | 4/2017 | Rappoport et al. | |
| 2017/0352188 A1* | 12/2017 | Levitt | G06F 1/1626 |
| 2018/0026152 A1 | 1/2018 | Benson et al. | |
| 2018/0069060 A1 | 3/2018 | Rappoport et al. | |
| 2018/0108329 A1 | 4/2018 | Vukicevic | |

FOREIGN PATENT DOCUMENTS

| | | |
|---|---|---|
| KR | 1020110011266 | 2/2011 |
| KR | 1020130124111 | 11/2013 |
| KR | 1020150017258 | 2/2015 |

OTHER PUBLICATIONS

PCT/ISA/210 Search Report issued on PCT/KR2017/005782, pp. 7.
PCT/ISA/237 Written Opinion issued on PCT/KR2017/005782, pp. 7.

* cited by examiner

SCREEN OUTPUT METHOD AND ELECTRONIC DEVICE SUPPORTING SAME

PRIORITY

This application is a National Phase Entry of PCT International Application No. PCT/KR2017/005782 which was filed on Jun. 2, 2017, and claims priority to Korean Patent Application No. 10-2016-0069091, which was filed on Jun. 2, 2016, the content of each of which is incorporated herein by reference.

TECHNICAL FIELD

The present disclosure relates to a method of outputting content through a screen in an electronic device, and an electronic device supporting the same.

BACKGROUND ART

An electronic device such as a smartphone, a tablet personal computer (PC), or the like may perform various functions such as wireless data communication, video playback, Internet search, or the like. The electronic device may output various screens depending on an operation. For example, the electronic device may output a home screen, a lock screen, an application execution screen, or the like.

DISCLOSURE

Technical Problem

A conventional electronic device operates in such a manner that a screen set by a user or a screen set in default by the electronic device is output, without changing a home screen, a lock screen, a screen off state, and the like in response to the surrounding environment. The electronic device may not provide the user with a variety of user experiences according to the changing surrounding situations.

Technical Solution

An electronic device includes a camera module capturing an image, a sensor module recognizing a signal associated with the electronic device or an external object, a first display and a second display, each of which is configured to output content, a memory, and a processor electrically connected to the camera module, the first display, the second display, and the memory. The processor is configured to determine whether the electronic device enters a first state, to capture a source image by using the camera module, when entering the first state, and to generate a first output image output on the first display or a second output image output on the second display based on the source image.

Advantageous Effects

A screen outputting method and an electronic device supporting the same according to various embodiments of the present disclosure may recognize the surrounding environment by using a camera module or a sensor module and may automatically output an image the same as or similar to the surrounding color or pattern to a plurality of displays.

A screen outputting method and an electronic device supporting the same according to various embodiments of the present disclosure may output various screens, such as a background screen, a pop-up screen, or the like, which are matched with the surrounding environment, thereby providing an emotional user experience.

MODE FOR INVENTION

Figure 1:
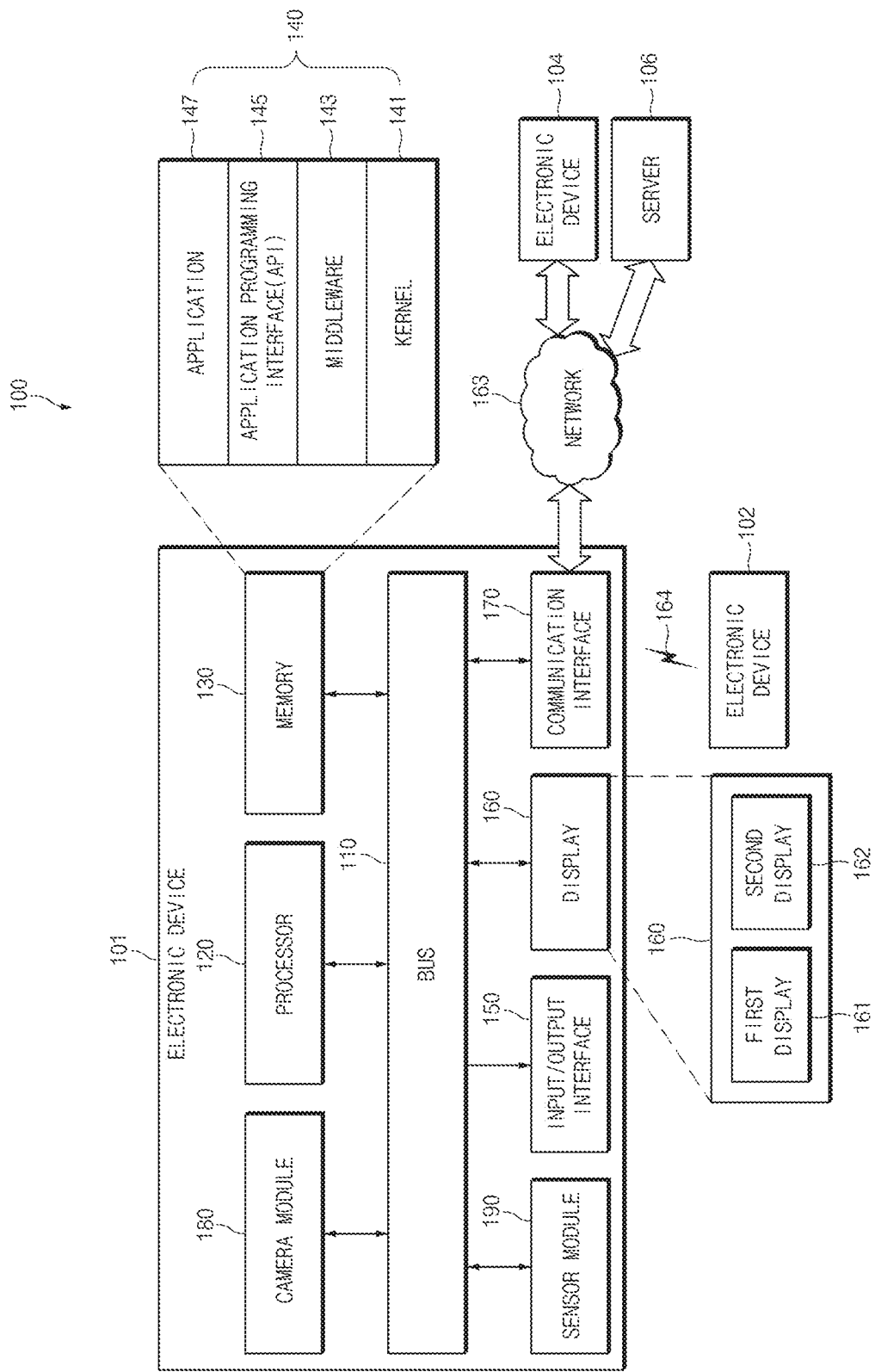
FIG. 1 illustrates a block diagram of an electronic device, according to various embodiments.

Various embodiments of the present disclosure may be described with reference to accompanying drawings. Embodiments and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A or/and B", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "configured to" used herein may be interchangeably used as, for example, the expression "suitable for", "having the capacity to", "designed to", "adapted to", "made to", or "capable of". The expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

According to various embodiments of the present disclosure, an electronic device may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. According to an embodiment, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs), points of sales (POSs), or internet of things (e.g., light bulbs, various sensors, sprinkler devices, fire alarms, thermostats, street lamps, toasters, exercise equipment, hot water tanks, heaters, boilers, and the like). According to another embodiment, the electronic devices may include at least one of parts of furniture, buildings/structures, or vehicles, electronic boards, electronic signature receiving devices, projectors, or various measuring instruments (e.g., water meters, electricity meters, gas meters, or wave meters, and the like). According to various embodiments, an electronic device may be a flexible electronic device or may be a combination of two or more of the above-described devices. An electronic device according to an embodiment of the present disclosure may not be limited to the above-described electronic devices. The term "user" used herein may refer to a person who uses an electronic device or may refer to a device (e.g., an artificial intelligence electronic device) that uses an electronic device.

Referring to FIG. 1, there is illustrated an electronic device 101 in a network environment 100 according to various embodiments. The electronic device 101 may include a bus 110, a processor 120, a memory 130, an input/output (I/O) interface 150, a display 160, and a communication interface 170. According to an embodiment, the electronic device 101 may not include at least one of the above-described components or may further include other component(s).

The bus 110 may interconnect the above-described elements 110 to 170 and may include a circuit for conveying communications (e.g., a control message or data) among the above-described elements. The processor 120 may include one or more of a central processing unit (CPU), an application processor (AP), or a communication processor (CP).

The processor 120 may perform, for example, data processing or an operation associated with control or communication of at least one other element(s) of the electronic device 101.

According to various embodiments, the processor 120 may recognize the change at a periphery of the electronic device 101, by using the camera module 180 or the sensor module 190. The processor 120 may change the content output through the display 160, based on the recognized information. For example, the processor 120 may capture an image of a bottom surface on which the electronic device 101 is placed. The processor 120 may extract a representative color, a representative pattern, or the like from the image of the bottom surface and then may change a background image output on the display 160 so as to be the same as the feature point (e.g., a color or a pattern) of the bottom surface. Additional information about a screen outputting method in which the processor 120 changes content based on the change of an environment at a periphery of the electronic device 101 may be provided through FIGS. 2 to 11.

The memory 130 may include a volatile and/or nonvolatile memory. For example, the memory 130 may store instructions or data associated with at least one other element(s) of the electronic device 101.

According to an embodiment, the memory 130 may store software and/or a program 140. The program 140 may include, for example, a kernel 141, a middleware 143, an application programming interface (API) 145, and/or an application program (or an "application") 147. At least a part of the kernel 141, the middleware 143, or the API 145 may be called an "operating system (OS)". The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the task requests. The API 145 may be an interface through which the application program 147 controls a function provided by the kernel 141 or the middleware 143, and may include, for example, at least one interface or function (e.g., an instruction) for a file control, a window control, image processing, a character control, or the like. For example, the I/O interface 150 may transmit an instruction or data, input from a user or another external device, to other element(s) of the electronic device 101, or may output an instruction or data, input from the other element(s) of the electronic device 101, to the user or the external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various kinds of contents (e.g., a text, an image, a video, an icon, a symbol, or the like) to a user. The display 160 may include a touch screen and may receive, for example, a touch, gesture, proximity, or hovering input using an electronic pen or a portion of a user's body.

According to various embodiments, the display 160 may include a first display 161 and a second display 162. For example, the first display 161 may be a main display disposed on the first surface of the electronic device 101; the second display 162 may be a sub display (e.g., an edge display, a side surface display, a rear surface display, or the like) disposed on a surface different from the first surface.

According to various embodiments, the first display 161 and the second display 162 may be configured to output different content. For example, the first display 161 may play a video; the second display 162 may display a button (e.g., play, pause, fast forward, backward, or the like) for controlling a video of the electronic device 101.

According to various embodiments, the first display 161 and the second display 162 may output an image associated with the source image collected through the camera module 180. For example, the first display 161 may output the first image obtained by performing image processing on the source image by using a first filter; the second display 162 may output the second image obtained by performing image processing on the source image by using a second filter. Additional information about the outputting method of the first display 161 and the second display 162 may be provided through FIGS. 2 to 11. According to an embodiment, the first display 161 and the second display 162 may be implemented with different areas on one display panel. For example, the first display 161 may be the front surface area of the electronic device 101; the second display 162 may be the edge area or the side surface area of the electronic device 101. According to another embodiment, the first display 161 and the second display 162 may be implemented on different display panels. For example, the first display 161 may be implemented through the front display panel of the electronic device 101, and the second display 162 may be implemented through the rear display panel of the electronic device 101.

Hereinafter, an embodiment is exemplified as the first display 161 is the front surface area of the electronic device 101 and the second display 162 is the edge area of the electronic device 101. However, an embodiment is not limited thereto. It is possible to be applied to various types of electronic devices including a plurality of displays.

The communication interface 170 may establish communication between the electronic device 101 and an external electronic device (e.g., a first external electronic device 102, a second external electronic device 104, or a server 106). For example, the communication interface 170 may be connected to a network 163 through wireless communication or wired communication to communicate with an external device (e.g., the second external electronic device 104 or the server 106).

The wireless communication may include a cellular communication that uses at least one of, for example, a long-term evolution (LTE), an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like. According to an embodiment, the local area network may include at least one of wireless fidelity (Wi-Fi), Bluetooth, Bluetooth low energy (BLE), Zigbee, near field communication (NFC), magnetic secure transmission (MST), or radio frequency (RF), or body area network (BAN). According to an embodiment, a wireless communication may include the GNSS. The GNSS may be, for example, a global positioning system (GPS), a global navigation satellite system (Glonass), a Beidou Navigation Satellite System (hereinafter referred to as "Beidou"), or an European global satellite-based navigation system (Galileo). In the present disclosure, "GPS" and "GNSS" may be interchangeably used. The wired communication may include at least one of, for example, a universal serial bus (USB), a high definition multimedia interface (HDMI), a recommended standard-232 (RS-232), a power line communication, a plain old telephone service (POTS), or the like. The network 163 may include at least one of a telecommunication network, for example, a computer network (e.g., LAN or WAN), an Internet, or a telephone network.

The camera module 180 may capture the periphery of the electronic device 101. The captured image may be used to change the output scheme of content output through the display 160. In various embodiments, the camera module 180 may include an optical lens. For example, in the case of using the optical lens, the camera module 180 may capture an image by using the field of view between 180 and 220 degrees.

In various embodiments, there are a plurality of camera modules 180. For example, the camera module 180 may include a front camera disposed on the front surface (a surface on which the display 160 is disposed) of the electronic device 101 and a rear camera disposed on the rear surface (a surface opposite to a surface on which the display 160 is disposed) of the electronic device 101.

The sensor module 190 may collect information about the electronic device 101 or the state of the periphery of the electronic device 101. For example, the sensor module 190 may include a gyro sensor or an acceleration sensor and may recognize the speed change, the acceleration change, or the like of the electronic device 101. For another example, the sensor module 190 may recognize the distance between a surrounding object and the electronic device 101, by using an IR sensor, a HRM sensor, or the like.

Each of the first and second external electronic devices 102 and 104 may be a device of which the type is different from or the same as that of the electronic device 101. According to various embodiments, all or a part of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from other devices (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service by processing the received result as it is, or additionally. To this end, for example, cloud computing, distributed computing, or client-server computing may be used.

Figure 2:
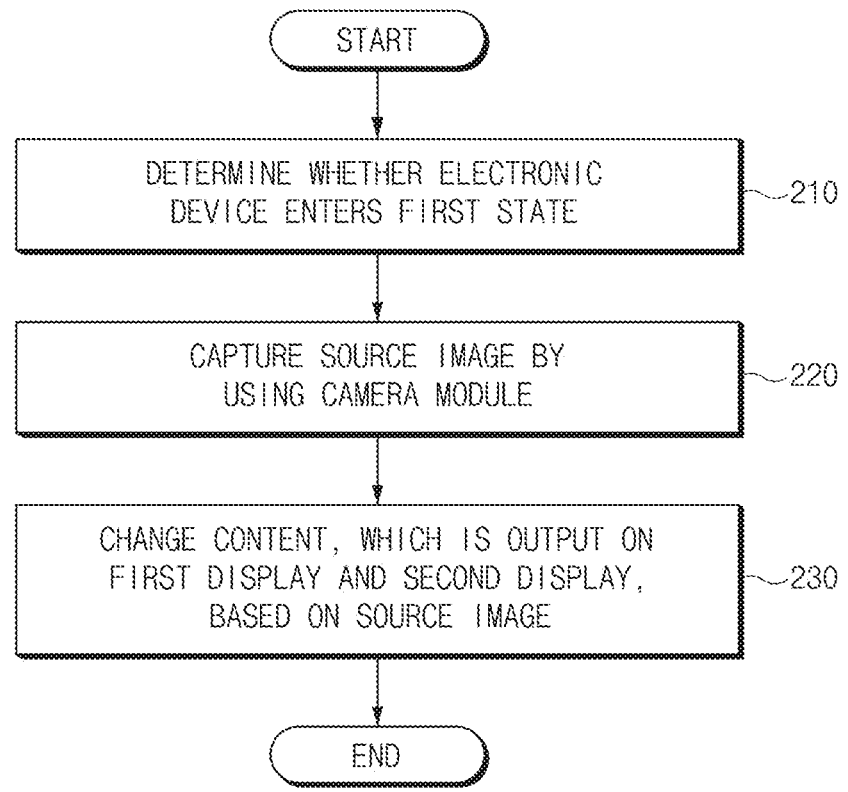
FIG. 2 is a flowchart for describing a method of displaying a screen by using a camera module, according to various embodiments.

FIG. 2 is a flowchart for describing a method of displaying a screen by using a camera module, according to various embodiments.

Referring to FIG. 2, in operation 210, the processor 120 may determine whether the electronic device 101 enters a first state. In an embodiment, the first state may be a state where the electronic device 101 is stopped without any movement. The processor 120 may determine whether the electronic device 101 is stopped, based on the measurement value of the sensor module 190 (e.g., a gyro sensor, a speed sensor, or the like). In another embodiment, the first state may be a state of moving at a speed of a specified range. For example, the first state may be a state where the electronic device 101 is moving while being seated on a vehicle. In another embodiment, the first state may be a state where the user is putting down the electronic device 101 on a floor (e.g., a desk, a ground, or the like). The electronic device 101 may recognize the first state through the sensor module 190.

Hereinafter, the case where the first state is stopped will be described. However, an embodiment is not limited thereto. The first state may be variously determined by a user or the settings of the electronic device 101 in itself.

When the electronic device 101 enters a first state, in operation 220, the processor 120 may capture a source image by using the camera module 180. In an embodiment, when the electronic device 101 enters the first state, the processor 120 may automatically execute the camera module 180 to capture the source image, without a separate user input. The source image may include an image associated with an object at a periphery of the electronic device 101.

For example, the processor 120 may capture a bottom surface (e.g., a desk, a table, or the like), on which the electronic device 101 is placed, by using the rear camera of the electronic device 101 to obtain the source image. For another example, the processor 120 may capture an external object (e.g., a user's face, a ceiling, sky, or the like) disposed on the front surface of the electronic device 101 by using the front camera of the electronic device 101 to use the captured image as the source image.

In various embodiments, the processor 120 may collect the source image through continuous shooting. At least part of a plurality of images, which are continuously captured, may be determined as the source image. For example, the processor 120 may determine an image, which has the high sharpness, from among the plurality of images as the source image. For another example, the processor 120 may combine the plurality of images to determine the source image.

According to various embodiments, the processor 120 may perform image processing on the source image to extract a feature point (e.g., a representative color or a representative pattern). For example, the processor 120 may extract the representative color and the representative pattern from the central area of the source image through filtering.

In various embodiments, the processor 120 may capture the source image by using the predetermined filter. The processor 120 may generate the source image composed of a specific color or pattern through a filter. In this case, the processor 120 may reduce the time for extracting the feature point of the source image through image processing.

In operation 230, the processor 120 may change content, which is output on the first display 161 and the second display 162, based on the source image. The processor 120 may generate a first output image output on the first display 161 or a second output image output on the second display 162, based on the source image. The processor 120 may apply the first output image to the first display 161; the processor 120 may apply the second output image to the second display 162.

For example, the processor 120 may output a first image obtained by performing image processing on the source image by using a first filter, on the first display 161; the processor 120 may output a second image obtained by performing image processing on the source image by using a second filter, on the second display 162. For another example, the processor 120 may change a background image, which is displayed on the first display 161, such as a home screen, a lock screen, or the like and may change the color of a shortcut icon output on the second display 162, by using the extracted representative color.

In another embodiment, the processor 120 may apply the pattern extracted from the source image, to a background image, which is displayed on the first display 161, such as a home screen, a lock screen, an always-on-display (AOD) screen, or the like and may change a button, which is displayed on the second display 162, to the extracted pattern.

In various embodiments, the processor 120 may output at least part of content output on the first display 161 and the second display 162 so as to be the same as (or similar to) both the pattern and the color of a bottom surface on which the electronic device 101 is placed. As such, the electronic device 101 may provide an interactive user experience (user interface) in which the content on a screen is changed in response to a surrounding environment.

In various embodiments, the processor 120 may change the image (hereinafter referred to as an "output image") output based on information collected through the sensor module 190. For example, an output image based on the representative color of the source image may be generated and then the brightness of the output image based on the value recognized through an illuminance sensor may be changed and output. The processor 120 may periodically measure the ambient brightness by using an illuminance sensor and may change the brightness of the output image depending on to the measured value.

In various embodiments, the processor 120 may store the generated output image as a separate file. The output image may be stored in the memory 160 and may be used for an album app, or the like. The user may share the generated output image to SNS and may utilize the generated output image as a background image.

According to various embodiments, the processor 120 may combine the content, which is displayed on the first display 161 and the second display 162, with the color or the pattern of the source image. For example, when the background image of the lock screen of the first display 161 is changed to a first color being the representative color of the source image, the processor 120 may display the text or the icon of date information, time information, weather information, or the like in a second color being a complementary color of the first color so as to be visible to the user's eyes.

Figure 3:
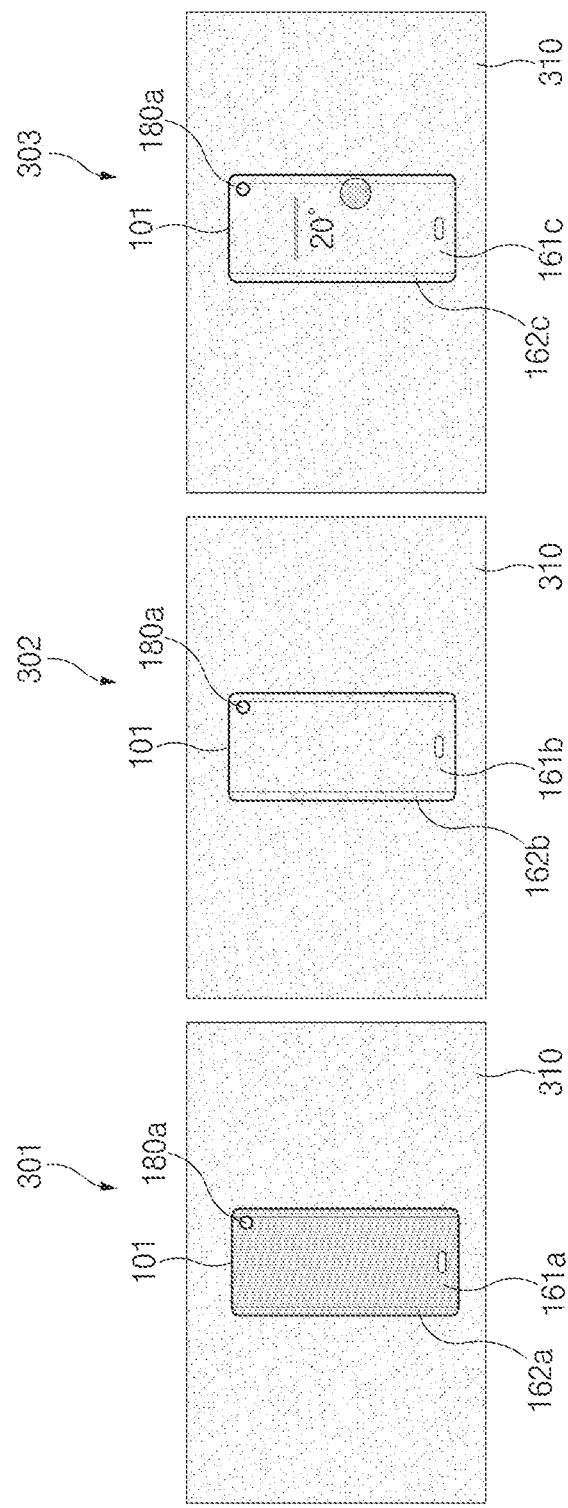
FIG. 3 is a screen exemplary view for describing a screen outputting method, according to various embodiments.

FIG. 3 is a screen exemplary view for describing a screen outputting method, according to various embodiments. An embodiment is exemplified in FIG. 3 as the electronic device 101 is stopped on the bottom surface. However, an embodiment is not limited thereto.

Referring to FIG. 3, in a first screen 301, the electronic device 101 may be in a stop state where the electronic device 101 is not moved while being placed on a bottom surface 310 (e.g., a desk, a table, or the like). The bottom surface 310 may have an original color or pattern.

In a state before the electronic device 101 is placed on the bottom surface 310 or in a state immediately after the electronic device 101 is placed on the bottom surface 310, a first display 161a may output content (e.g., a home screen, a lock screen, an app execution screen, an AOD screen, or the like) that is not associated with the bottom surface 310 or may be in a state (e.g., a screen off state) where there is no separate output. For example, the first display 161a may be in a state where the first display 161a outputs a background image set by a user or a background image set by default by the electronic device 101.

A second display 162a may output content (e.g., an app execution icon, a shortcut icon, a touch button, or the like) that is not associated with the bottom surface 310 or may be in a state (e.g., a screen off state) where there is no separate output.

When the electronic device 101 remains stationary during a specified time (e.g., 0.5 second), the processor 120 may capture the bottom surface 310 by using the camera module 180. For example, the processor 120 may capture the bottom surface 310, on which the electronic device 101 is placed, by using a rear camera (not illustrated, a camera mounted on a surface opposite to a surface on which the first display 161a is mounted) to obtain a source image.

In various embodiments, when it is determined that the external light input through a camera lens is insufficient, the processor 120 may operate the flash to capture the source image. The processor 120 may extract a feature point (e.g., a representative color or pattern) from the source image and may generate the output image based on the extracted feature point.

In various embodiments, unlike a general photo shoot, the processor 120 may not output the captured source image on the first display 161a in real time. In the process in which the source image is captured, the first display 161a may continuously remain in the existing state (e.g., the state where a home screen is displayed, a screen off state, or a lock screen state). The user may not be aware or interested in the process in which the source image is captured.

In various embodiments, the processor 120 may collect the source image through continuous shooting. The processor 120 may enhance the accuracy of representative color extraction or representative pattern extraction, by using a plurality of images.

According to various embodiments, the processor 120 may capture the source image by using a front camera 180a. In this case, the front camera 180a may capture an external object (e.g., the user's face, a ceiling, sky, or the like) disposed on the front surface of the electronic device 101 to use the captured image as the source image.

In a second screen 302, a first output image generated by using the source image may be output on a first display 161b. When a user looks at the electronic device 101 from the outside, a color or pattern the same as (or similar to) the color or pattern included in the bottom surface 310 may be displayed on the first display 161b.

A second output image generated by using the source image may be output on a second display 162b. The color or pattern the same as (or similar to) the color or pattern included in the bottom surface 310 may be displayed on the second display 162b.

The electronic device 101 may provide a user experience that is changed automatically such that the first display 161b and the second display 162b are matched with a surrounding environment.

In a third screen 303, the processor 120 may combine and output other content displayed on a first display 161c or a second display 162c as well as a background image with the color or pattern of the source image. The processor 120 may change a method of outputting the text or icon output on the first display 161c or the second display 162c in consideration of the color or pattern of the bottom surface 310. For example, the color of the text or icon may be output as the color contrasted with the background color (e.g., complementary color) or may be output such that the text or icon has a pattern the same as a background pattern.

Figure 4:
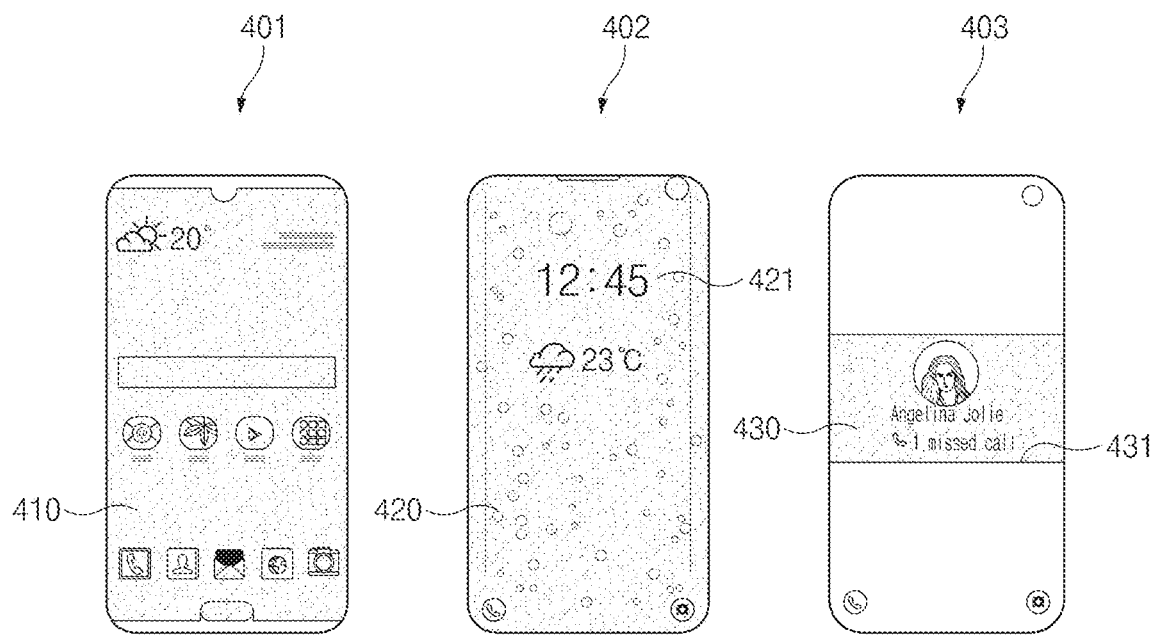
FIG. 4 is a screen exemplary view in which a source image is used as a background image of a first display, according to various embodiments.

FIG. 4 is a screen exemplary view in which a source image is used as a background image of a first display, according to various embodiments. FIG. 4 is, but is not limited to, an example.

Referring to FIG. 4, in a screen 401, the processor 120 may change a background image 410 of a home screen by using a feature point (e.g., a representative color, a representative pattern, or the like) extracted from a source image. When a user places an electronic device on a desk, a table, or the like, the processor 120 may output the background image 410 of the home screen in the form the same as or suitable for the desk, the table, or the like, on which the electronic device 101 is placed. In various embodiments, the processor 120 may change the color of the text or icon displayed on the home screen, to a color contrasted with the color of the changed background image 410, thereby enhancing the visibility.

In a screen 402, the processor 120 may change a background image 420 of a lock screen by using a feature point (e.g., a representative color, a representative pattern, or the like) extracted from a source image. The processor 120 outputs a notification display, a weather display, and the like 421 displayed on the lock screen in the color or pattern contrasted with the color of the background image 420, thereby enhancing the visibility.

In a screen 403, the processor 120 may change a background image 430 of the pop-up window or the notification window by using a feature point (e.g., a representative color, a representative pattern, or the like) extracted from the source image. When a user places an electronic device on a desk, a table, or the like, the processor 120 may extract the color or pattern of the desk or the table, in a screen off state. When the pop-up window or the notification window is output depending on the execution of an application inside the electronic device 101 (e.g., message reception, call reception, a schedule notification, or the like), the processor 120 may output the pop-up window or the notification window having a background, the color or the pattern of which is the same as the color or the pattern of the desk or the table.

Figure 5:
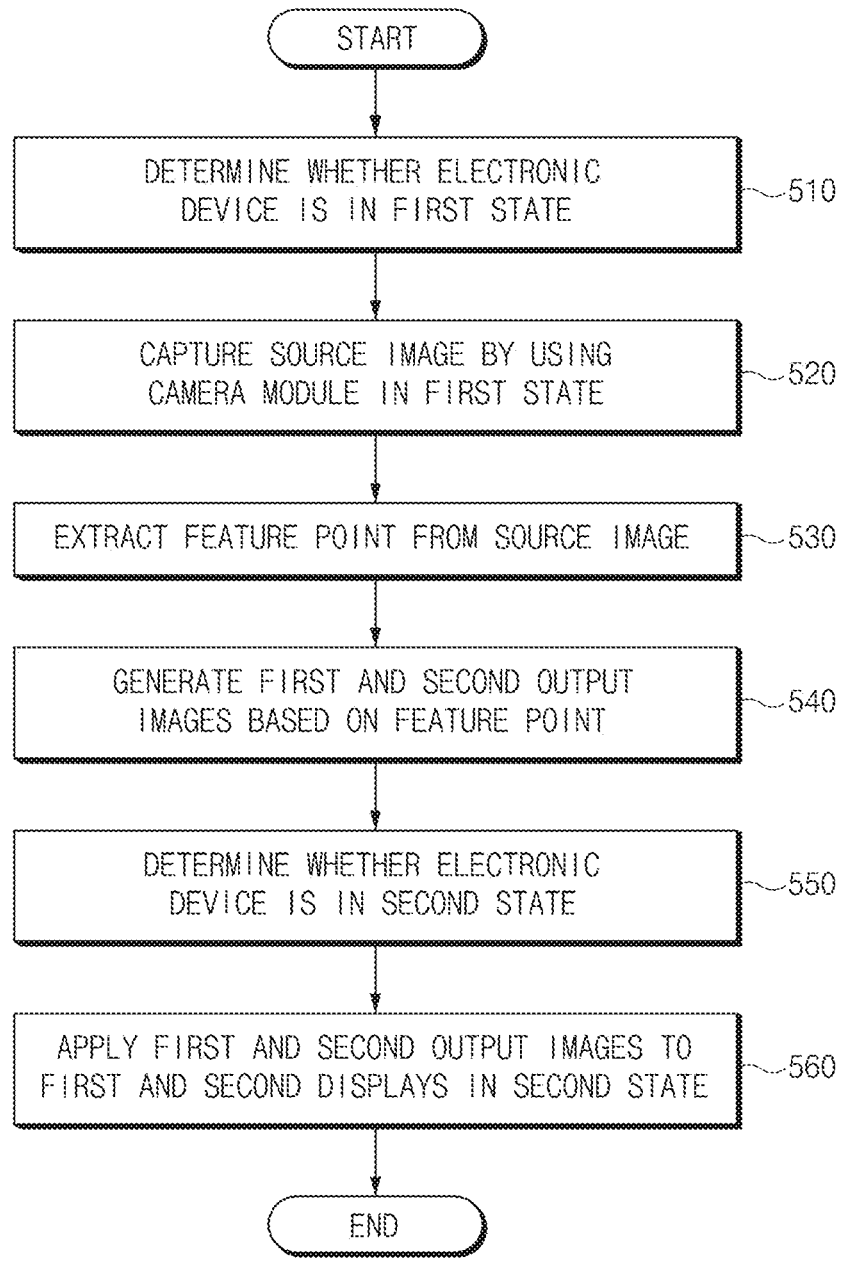
FIG. 5 is a flowchart for describing a method of recognizing a plurality of states of an electronic device and outputting a screen, according to various embodiments.

FIG. 5 is a flowchart for describing a method of recognizing a plurality of states of an electronic device and outputting a screen, according to various embodiments.

Referring to FIG. 5, in operation 510, the processor 120 may determine whether the electronic device 101 is in a first state, by using the sensor module 190. In an embodiment, the first state may be a state where the electronic device 101 is moving at a speed that is not greater than the specified speed or the specified acceleration or a state where a distance from an external object is within a predetermined range.

In various embodiments, the processor 120 may determine whether the electronic device 101 enters a first state, based on at least one of a movement speed of the electronic device 101 or a distance between the electronic device 101 and an external object, which is measured through the sensor module 190. For example, when the movement speed of the electronic device 101 measured by using a gyro sensor or an acceleration sensor is not greater than a first threshold value (e.g., 10 cm/s) and when the distance between the electronic device 101 and the external object (e.g., a table) measured by using an IR sensor or a HRM sensor is not greater than a second threshold value (e.g., 20 cm), the processor 120 may determine that the electronic device 101 enters the first state.

In operation 520, the processor 120 may capture the periphery (e.g., a bottom surface) of the electronic device 101 by using the camera module 180 to obtain a source image, in the first state. In various embodiments, the captured source image may be temporarily stored in a buffer and may not be identified in an album app or the like. Furthermore, the source image may not be displayed on the display 150 in real time, and a user may not be aware of or interested in the capture of the source image.

In operation 530, the processor 120 may perform image processing on the source image to extract a feature point (e.g., a representative color or a representative pattern). For example, the processor 120 may extract the representative color and the representative pattern from the central area of the source image through filtering.

In operation 540, the processor 120 may generate the first output image and the second output image based on the extracted feature point. The first output image may be an image to be output through the first display 161, and the second output image may be an image to be output through the second display 162. For example, the first output image may have the color or pattern the same as the desk or the table, on which the electronic device 101 is placed, and the second output image may be an icon image or a touch button image having the color or pattern the same as the desk or the table. For another example, the first output image and the second output image may have a pattern the same as the desk or the table, on which the electronic device 101 is placed, and may have a color (e.g., a complementary color) contrasted with a color of the desk or the table.

In various embodiments, the processor 120 may store the generated output image in the graphic RAM of a display driver integrated circuit.

In operation 550, the processor 120 may determine whether the electronic device 101 is in a second state. In an embodiment, the second state may be a state where the electronic device 101 is stopped without any movement. The processor 120 may determine whether the electronic device 101 is stopped, based on the measurement value of the sensor module 190 (e.g., a gyro sensor, a speed sensor, or the like).

In operation 560, the processor 120 may apply the first output image to the first display 161; the processor 120 may apply the second output image to the second display 162, in the second state. For example, the background image of a home screen, a lock screen, or the like of the first display 161 may be changed to the output image, the color or the pattern of which is the same as (or similar to) a surrounding color or pattern. The icon, the touch button, or the like of the second display 162 may be changed to the output image, the color or the pattern of which is the same as (or similar to) a surrounding color or pattern.

According to various embodiments, in the second state, the processor 120 may periodically recognize the change in the surrounding situation, by using a camera module, a sensor module, or the like. When the color or the pattern of a periphery of the electronic device 101 is changed, the processor 120 may update the first output image or the second output image.

Figure 6:
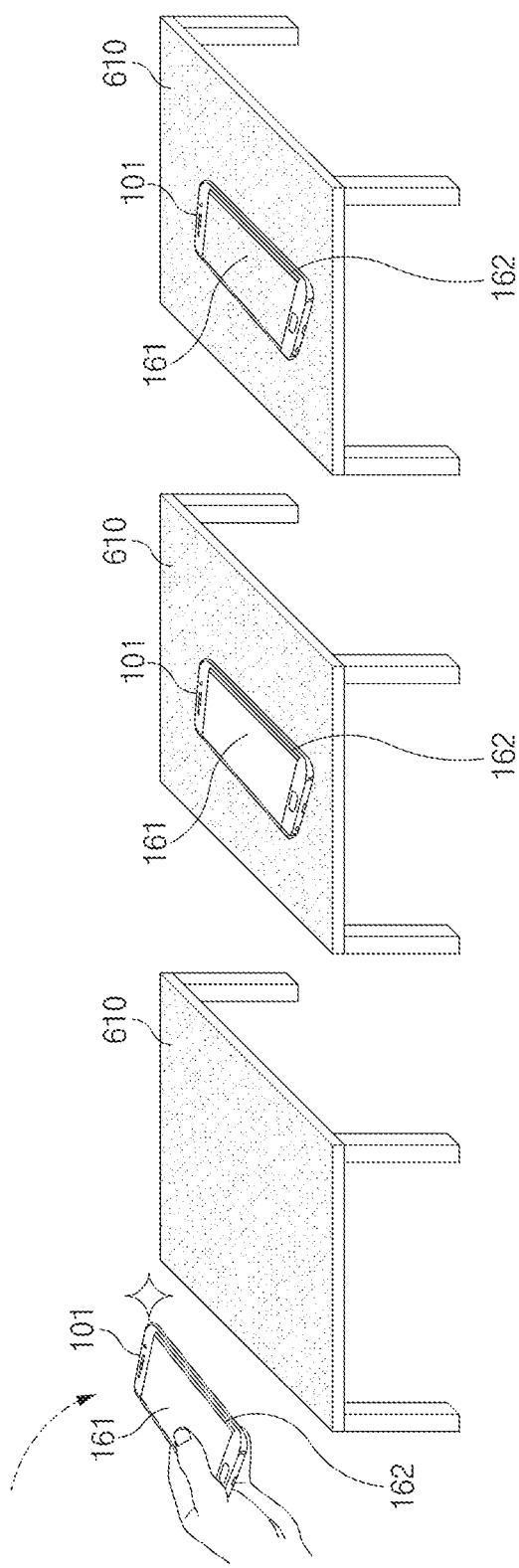
FIG. 6 is an exemplary view of extracting a feature point in a plurality of states, according to various embodiments.

FIG. 6 is an exemplary view of extracting a feature point in a plurality of states, according to various embodiments. FIG. 6 is, but is not limited to, an example.

Referring to FIG. 6, in a first operation 601, when a user places the electronic device 101 on a table 610, the processor 120 may determine whether the electronic device 101 enters a first state. For example, the first state may be a state where the electronic device 101 is moving at a specified speed or less or the distance from the table 610 is within a predetermined range (e.g., 20 cm).

When entering the first state, the processor 120 may capture a surrounding environment (e.g., the bottom surface of the table 610) by using the camera module 180 (e.g., a rear camera).

The processor 120 may perform image processing on the source image to extract a feature point (e.g., a representative color or a representative pattern). The processor 120 may generate the first output image and the second output image based on the extracted feature point.

For example, the processor 120 may calculate the RGB average value of all the pixels constituting the source image or may calculate an RGB average value of a partial area (e.g., pixels within a specific range from the center point of the source image) selected from the source image. For another example, the processor 120 may sample pixels constituting the source image to calculate the RGB average value.

In a second operation 602, the processor 120 may determine whether to enter a second state. The second state may be a state where the electronic device 101 is stopped without any movement. The processor 120 may determine whether the electronic device 101 is stopped, based on the measurement value of the sensor module 190 (e.g., a gyro sensor, a speed sensor, or the like).

For example, when X value, Y value, and Z value of an acceleration sensor are not changed and a state where Z value is not less than 9.0 is maintained for 1 second or more, the processor 120 may determine that the electronic device 101 enters a stop state.

In a third operation 603, the processor 120 may apply a first output image and a second output image to the first display 161 and the second display 162. The display 160 may output an image of the color or pattern the same as (or similar to) the color or pattern of the table 610.

Figure 7:
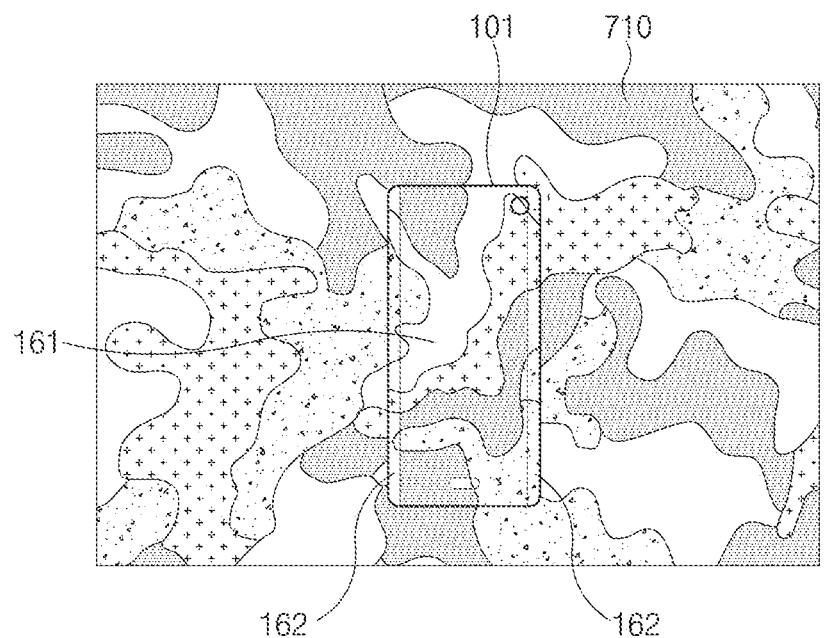
FIG. 7 is a screen exemplary view in which a feature point extracted from a source image is applied, according to various embodiments.

FIG. 7 is a screen exemplary view in which a feature point extracted from a source image is applied, according to various embodiments. FIG. 7 is, but is not limited to, an example.

Referring to FIG. 7, when a bottom surface 710 on which the electronic device 101 is placed has a camouflage pattern, the first display 161 may output a pattern the same as the bottom surface 710. The processor 120 may capture the bottom surface 710 by using a rear camera, before or after the electronic device 101 is placed on the bottom surface 710. The processor 120 may process the captured image to extract a camouflage pattern and color. The processor 120 may change the background image of a lock screen or an AOD screen displayed on the first display 161, based on the extracted pattern and color.

According to various embodiments, the processor 120 may perform image processing on a source image in the manner different from a first output image, which is output on the first display 161, to generate a second output image to be output on the second display 162. For example, when a user looks at the electronic device 101 in front, by extending the source image in the lateral direction, the processor 120 may generate the second output image such that a camouflage pattern is continuous with the first output image output on the first display 161. The generated second output image may be output through the second display 162.

According to an embodiment, when the location of the electronic device 101 on the bottom surface 710 is changed, the processor 120 may capture the source image again to update the first output image and the second output image. When the electronic device 101 moves in the horizontal direction and remains in a stop state through a sensor module (e.g., a gyro sensor or an acceleration sensor), the processor 120 may capture the source image by using the camera module 180 again. The processor 120 may change the first output image and the second output image, by using the updated source image.

According to another embodiment, when the movement of the electronic device 101 is within a specified range, the processor 120 may update the output image by using the source image stored in a buffer before the movement. For example, when the movement range of an electronic device recognized through a sensor module (e.g., a gyro sensor or an acceleration sensor) is within 5 cm, the processor 120 may move the source image stored in the buffer by a corresponding distance to extract a feature point again. The processor may generate and output the first output image and the second output image by using a new extracted feature point.

Figure 8:
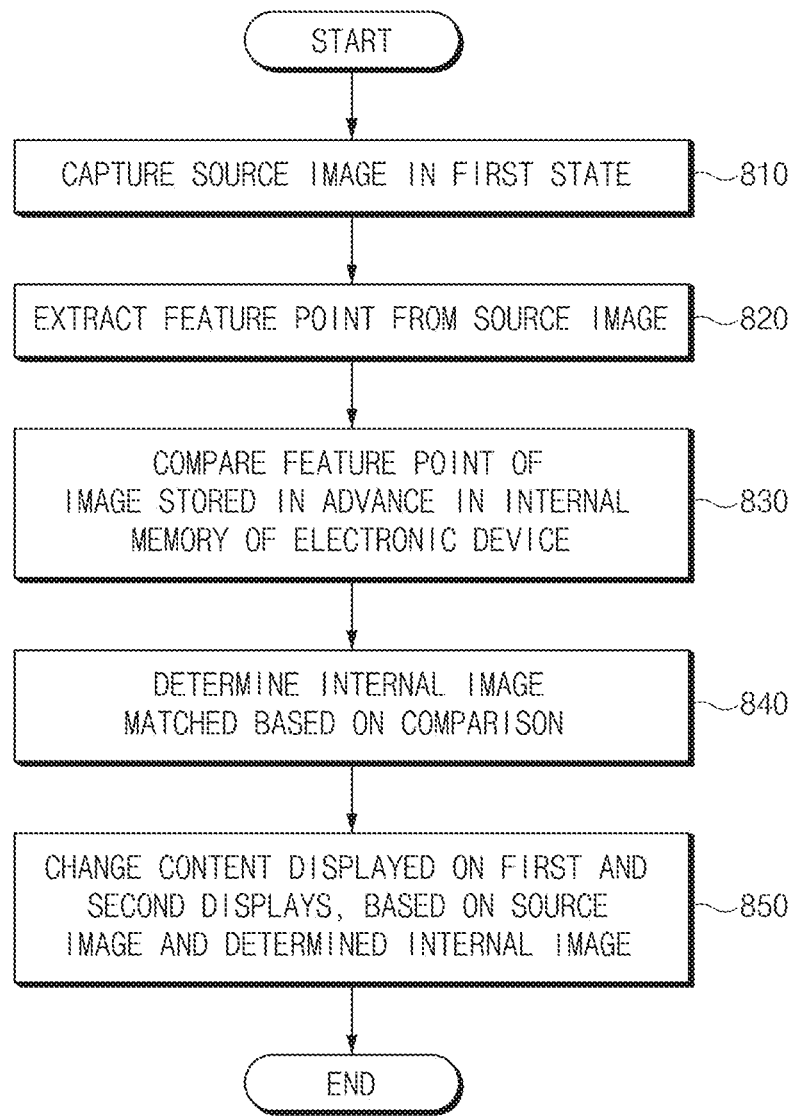
FIG. 8 is a flowchart for describing a screen outputting method by using an internal image, according to various embodiments.

FIG. 8 is a flowchart for describing a screen outputting method by using an internal image, according to various embodiments.

Referring to FIG. 8, in operation 810, the processor 120 may capture a source image, in a state where the electronic device 101 is in a first state (e.g., a stop state, a state of a specified speed or less, a state of being disposed within a specified distance from a bottom surface, or the like).

In operation 820, the processor 120 may extract a feature point from a source image. The processor 120 may extract the representative color or the representative pattern of the source image through filtering.

In operation 830, the processor 120 may compare the feature point of an image stored in advance in an internal memory of the electronic device 101, based on the extracted feature point.

The processor 120 may store information about a feature point (e.g., a representative color or a representative pattern) associated with an image (e.g., an image stored in an album app) (hereinafter referred to as an "internal image") stored in the memory 130. The processor 120 may compare the feature point of the source image with the feature point of the internal image.

In operation 840, the processor 120 may determine the internal image matched based on the comparison. For example, the processor 120 may determine the internal image, which has the highest matching rate with the feature point of the source image or which has a match ratio of a specified value or more.

In operation 850, the processor 120 may change the content displayed on the first display 161 and the second display 162, based on the source image or the determined internal image. For example, the processor 120 may combine the source image with the determined internal image to output the combined result as the background image of the first display 161 and the second display 162. For another example, the processor 120 may change a part of the determined internal image or may extract a partial area to output the changed result as the background image of the first display 161 and the second display 162.

Figure 9:
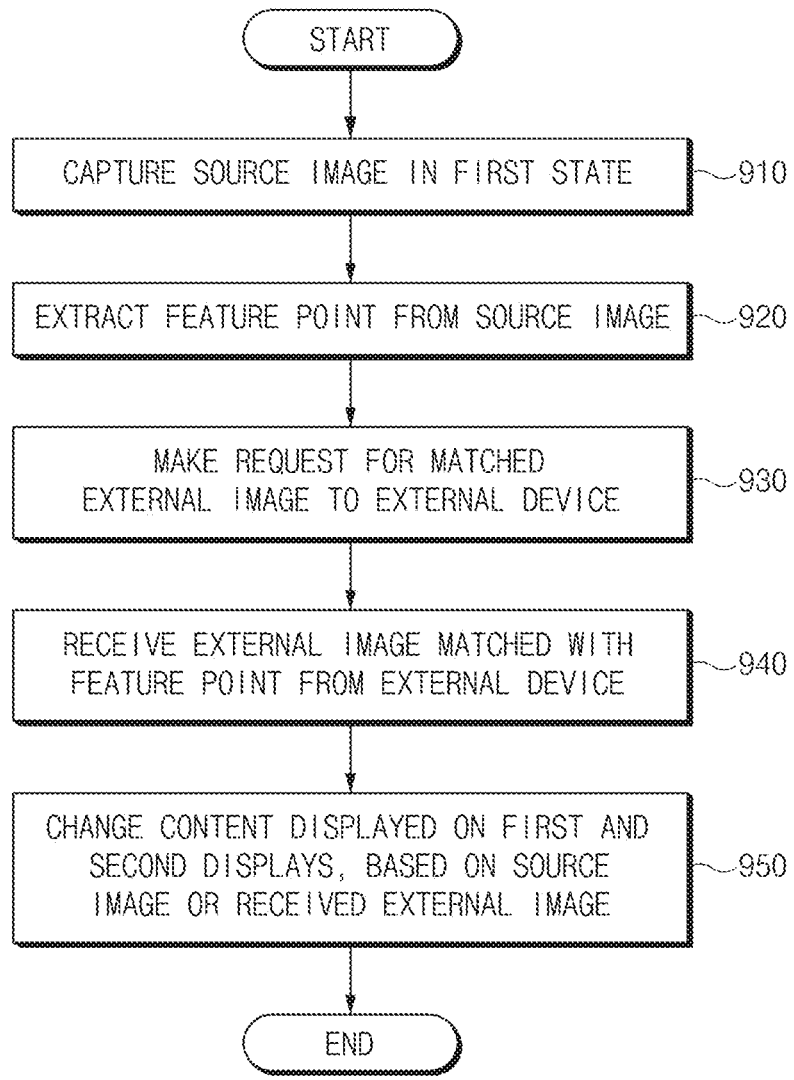
FIG. 9 is a flowchart for describing a screen outputting method by using an external image, according to various embodiments.

FIG. 9 is a flowchart for describing a screen outputting method by using an external image, according to various embodiments.

Referring to FIG. 9, operation 910 and operation 920 may be the same as or similar to operation 810 to operation 820.

In operation 930, the processor 120 may make a request for a matched external image to an external device (e.g., the server 106 of FIG. 1). The processor 120 may transmit information about the extracted feature point to the external device and may request the external device to transmit the matched image.

In operation 940, the processor 120 may receive the external image matched with the feature point, from the external device.

In operation 950, the processor 120 may change the content displayed on the first display 161 and the second display 162, based on the source image or the received external image. For example, the processor 120 may combine the source image with the received external image to output the combined result as the background image of the first display 161 and the second display 162. For another example, the processor 120 may change a part of the received external image or may extract a partial area and then may output the changed or extracted result as the background image of the first display 161 and the second display 162.

Figure 10:
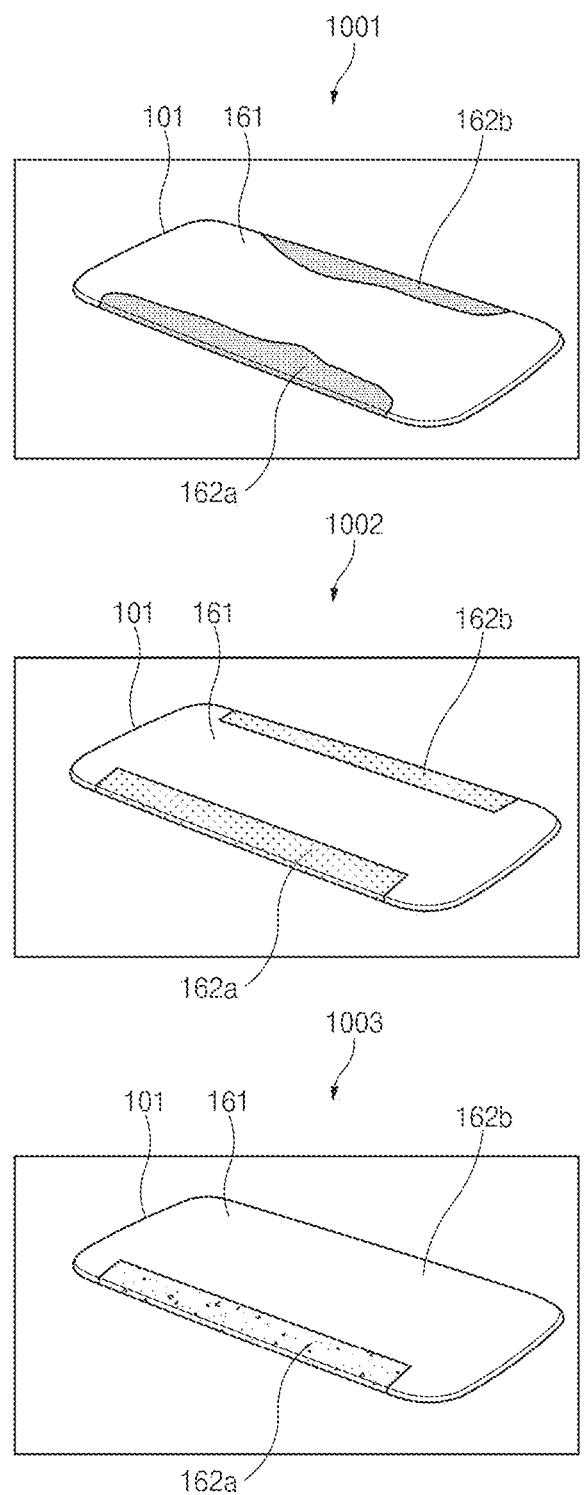
FIG. 10 is an exemplary view in which a second output image is applied to a second display, according to various embodiments.

FIG. 10 is an exemplary view in which a second output image is applied to a second display, according to various embodiments. An embodiment is exemplified in FIG. 10 as the second display 162 is the left-side or right-side area of the electronic device 101. However, an embodiment is not limited thereto.

Referring to FIG. 10, in a screen 1001, the processor 120 may change second displays 162*a* and 162*b* so as to be the same as the surrounding color or pattern, in a state where the first display 161 is in a screen off state. For example, when the electronic device 101 is in a stop state, the processor 120 may capture the surrounding lighting by using a front camera. The processor 120 may output the pattern, the shape of which is similar to the corresponding lighting, to the second displays 162*a* and 162*b*.

In various embodiments, the image output on the second displays 162*a* and 162*b* may be changed in response to the sound generated from the periphery in real time. For example, when an object generating the sound is present at the left side of the electronic device 101, the image change of the second display 162*a* may be greater than the image change of the second display 162*b*.

In a screen 1002, the processor 120 may change the second displays 162*a* and 162*b* so as to be the same as the surrounding color or pattern, in a state where another image is output on the first display 161. For example, when the electronic device 101 is in a stop state, a video playing screen may be output on the first display 161, and the surrounding image captured by using a front camera may be output on the second displays 162*a* and 162*b*.

In a screen 1003, the processor 120 may allow only one area among the second displays 162a and 162b to be output depending on a specified condition. For example, when an object generating the sound is present at the left side of the electronic device 101, the processor 120 may allow an image of a pattern the same as the periphery to be output on the second display 162a and may not allow a separate image to be output on the second display 162b.

Figure 11:
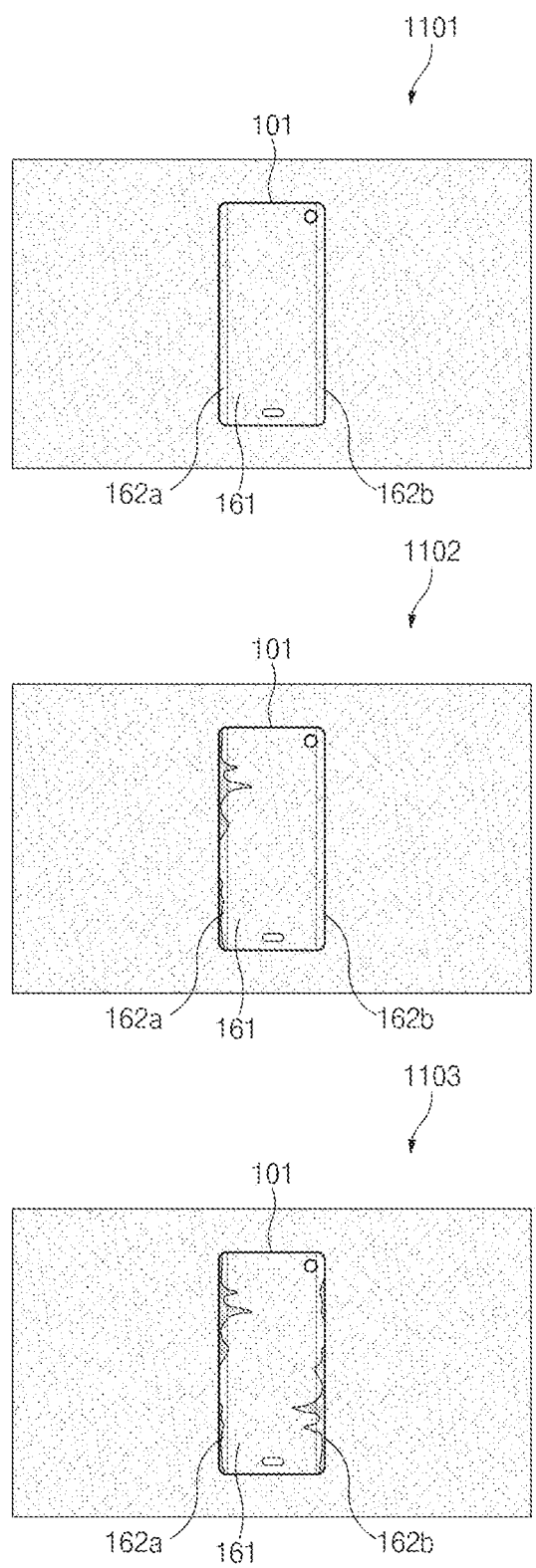
FIG. 11 is a screen exemplary view for describing a dynamic change of first and second output images, according to various embodiments.

FIG. 11 is a screen exemplary view for describing a dynamic change of first and second output images, according to various embodiments.

Referring to FIG. 11, after the image output on the first display 161 and the second displays 162a and 162b is changed in response to the change of a surrounding environment (e.g., a bottom surface 1110), the processor 120 may update first and second output images based on information collected through the camera module 180 or the sensor module 190. An embodiment is exemplified in FIG. 11 as the output image is updated based on the sound collected through a peripheral microphone. However, an embodiment is not limited thereto. For example, the brightness of the output image may be changed depending on the ambient brightness measured by using an illuminance sensor.

In a screen 1101, the processor 120 may output the first display 161 and the second displays 162a and 162b in a color or pattern the same as or similar to the bottom surface 1110.

In a screen 1102, when there is a first object generating the sound at the left side of the electronic device 101, the processor 120 may recognize the direction of the sound through a microphone. The processor 120 may output an additional pattern that changes in real time on the second display 162a and the left-side area of the first display 161 depending on the pattern of the sound generated at the first object.

In a screen 1103, when there is a second object generating the sound at the right side of the electronic device 101, the processor 120 may recognize the direction of the sound through a microphone. The processor 120 may output an additional pattern that changes in real time on the second display 162b and the right-side area of the first display 161 depending on the pattern of the sound generated at the second object.

Figure 12:
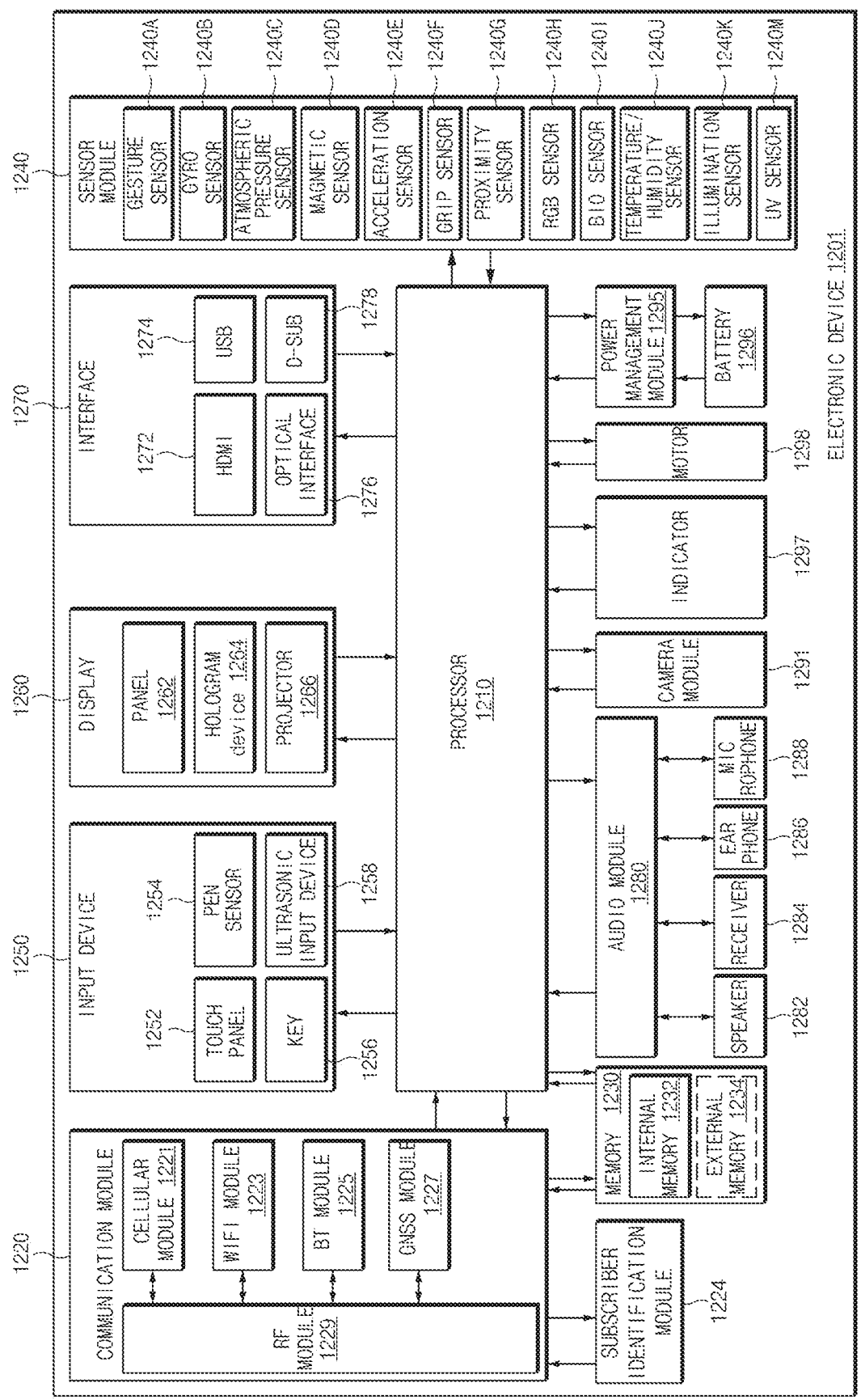
FIG. 12 illustrates a block diagram of the electronic device, according to various embodiments.

FIG. 12 is a block diagram illustrating an electronic device 1201, according to various embodiments.

An electronic device 1201 may include, for example, all or a part of an electronic device 101 illustrated in FIG. 1. The electronic device 1201 may include one or more processors (e.g., an application processor (AP)) 1212, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1297, and a motor 1298. The processor 1210 may drive an operating system (OS) or an application program to control a plurality of hardware or software elements connected to the processor 1210 and may process and compute a variety of data. The processor 1210 may be implemented with a System on Chip (SoC), for example. According to an embodiment, the processor 1210 may further include a graphic processing unit (GPU) and/or an image signal processor. The processor 1210 may include at least a part (e.g., a cellular module 1221) of elements illustrated in FIG. 12. The processor 1210 may load and process an instruction or data, which is received from at least one of other elements (e.g., a nonvolatile memory) and may store result data in a nonvolatile memory.

The communication module 1220 may be configured the same as or similar to a communication interface 170. For example, the communication module 1220 may include a cellular module 1221, a wireless-fidelity (Wi-Fi) module 1223, a Bluetooth (BT) module 1225, a global navigation satellite system (GNSS) module 1227, a near field communication (NFC) module 1228, and a radio frequency (RF) module 1229. The cellular module 1221 may provide voice communication, video communication, a character service, an Internet service, or the like through a communication network. According to an embodiment, the cellular module 1221 may perform discrimination and authentication of the electronic device 1201 within a communication network using the subscriber identification module 1224 (e.g., a SIM card). According to an embodiment, the cellular module 1221 may perform at least a portion of functions that the processor 1210 provides. According to an embodiment, the cellular module 1221 may include a communication processor (CP). According to an embodiment of the present disclosure, at least a portion (e.g., two or more components) of the cellular module 1221, the Wi-Fi module 1223, the BT module 1225, the GNSS module 1227, and the NFC module 1228 may be included within one Integrated Circuit (IC) or an IC package. The RF module 1229 may transmit and receive, for example, a communication signal (e.g., an RF signal). The RF module 1229 may include a transceiver, a power amplifier module (PAM), a frequency filter, a low noise amplifier (LNA), an antenna, or the like. According to another embodiment, at least one of the cellular module 1221, the Wi-Fi module 1223, the BT module 1225, the GNSS module 1227, or the NFC module 1228 may transmit and receive an RF signal through a separate RF module. The subscriber identification module 1224 may include, for example, a card or an embedded SIM which includes a subscriber identification module and may include unique identification information (e.g., integrated circuit card identifier (ICCID)) or subscriber information (e.g., integrated mobile subscriber identity (IMSI)).

For example, the memory 1230 (e.g., the memory 130) may include an internal memory 1232 or an external memory 1234. For example, the internal memory 1232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 1234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be functionally or physically connected with the electronic device 1201 through various interfaces.

The sensor module 1240 may measure, for example, a physical quantity or may detect an operating state of the electronic device 1201. The sensor module 1140 may convert the measured or detected information to an electric signal. The sensor module 1240 may include at least one of a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (e.g., a red, green, blue (RGB)

sensor), a living body sensor 1240I, a temperature/humidity sensor 1240J, an illuminance sensor 1240K, or an UV sensor 1240M. Although not illustrated, additionally or generally, the sensor module 1240 may further include, for example, an e-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit that controls at least one or more sensors included therein. According to an embodiment, the electronic device 1201 may further include a processor which is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a (digital) pen sensor 1254, a key 1256, or an ultrasonic input device 1258. The touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user. The (digital) pen sensor 1254 may be, for example, a part of a touch panel or may include an additional sheet for recognition. The key 1256 may include, for example, a physical button, an optical key, a keypad, and the like. The ultrasonic input device 1258 may detect (or sense) an ultrasonic signal, which is generated from an input device, through a microphone (e.g., a microphone 1288) and may verify data corresponding to the detected ultrasonic signal.

The display 1260 (e.g., the display 160) may include a panel 1262, a hologram device 1264, a projector 1266, and/or a control circuit that controls the panel 1262, the hologram device 1264, and the projector 1266. The panel 1262 may be implemented to be flexible, transparent or wearable, for example. The panel 1262 and the touch panel 1252 may be integrated into one or more modules. According to an embodiment, the panel 1262 may include a pressure sensor (or a "force sensor") that is capable of measuring the intensity of pressure on the touch of the user. The pressure sensor may be integrated with the touch panel 1252 or may be implemented with one or more sensors that are independent of the touch panel 1252. The hologram device 1264 may display a stereoscopic image in a space using a light interference phenomenon. The projector 1266 may project light onto a screen so as to display an image. The screen may be arranged inside or outside the electronic device 1201. The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 170 illustrated in FIG. 1. Additionally or alternatively, the interface 1270 may include, for example, a mobile high definition link (MHL) interface, a secure Digital (SD) card/ multi-media card (MMC) interface, or an infrared data association (IrDA) standard interface.

The audio module 1280 may convert a sound and an electric signal in dual directions. At least a part of the audio module 1280 may be included, for example, in the I/O interface 145 illustrated in FIG. 1. The audio module 1280 may process, for example, sound information that is input or output through a speaker 1282, a receiver 1284, an earphone 1286, or a microphone 1288. The camera module 1291 for shooting a still image or a video may include, for example, at least one image sensor (e.g., a front sensor or a rear sensor), a lens, an image signal processor (ISP), or a flash (e.g., an LED or a xenon lamp) The power management module 1295 may manage, for example, power of the electronic device 1201. According to an embodiment, the power management module 1295 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method, or an electromagnetic method and may further include an additional circuit, for example, a coil loop, a resonant circuit, a rectifier, or the like. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. For example, the electronic device 1201 may include a mobile TV supporting device that processes media data according to the standards of digital multimedia broadcasting (DMB), digital video broadcasting (DVB), MediaFlo™, or the like. Each of the above-mentioned elements of the electronic device according to various embodiments of the present disclosure may be configured with one or more components, and the names of the elements may be changed according to the type of the electronic device. According to various embodiments, the electronic device (e.g., the electronic device 1201) may exclude some elements or may further include other additional elements. Alternatively, some of the elements of the electronic device may be combined with each other so as to form one entity, so that the functions of the elements may be performed in the same manner as before the combination.

Figure 13:
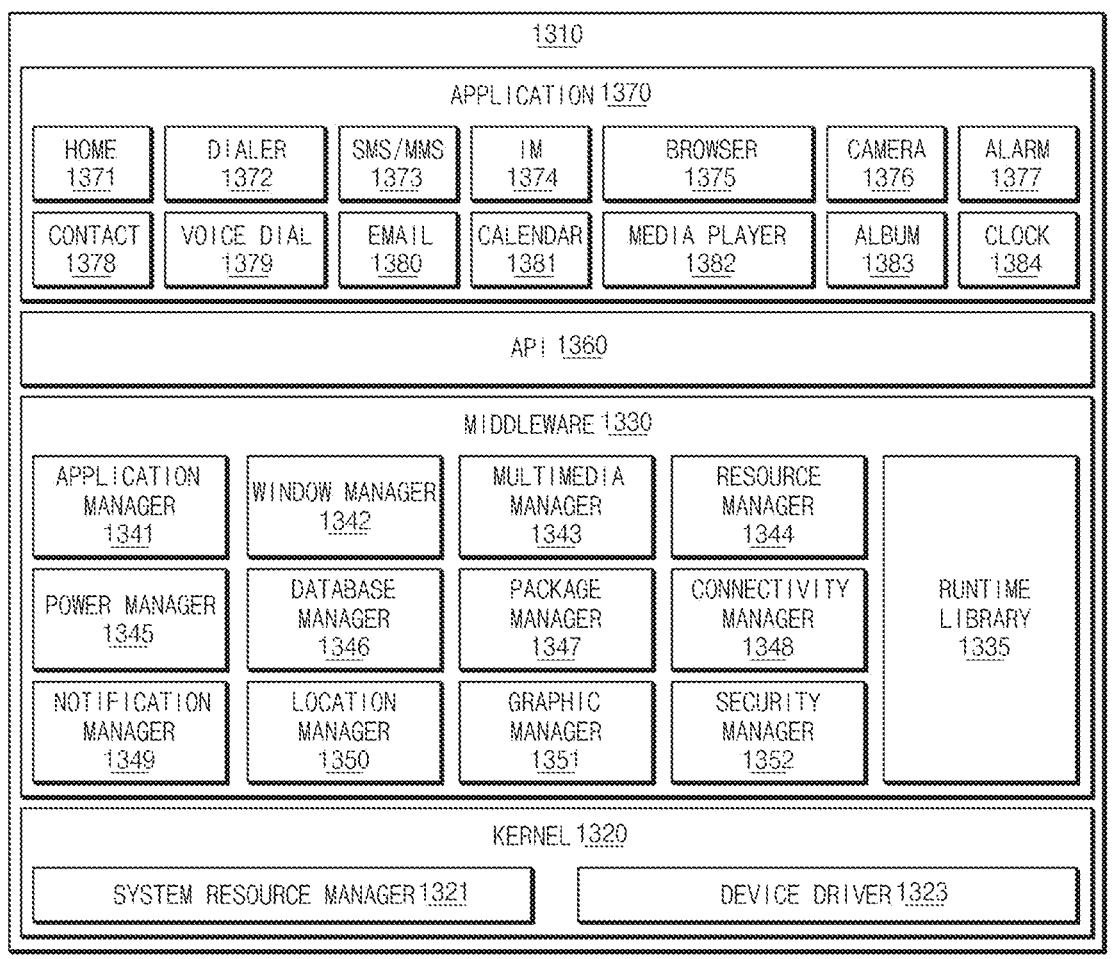
FIG. 13 illustrates a block diagram of a program module, according to various embodiments.

FIG. 13 is a block diagram of a program module, according to various embodiments. According to an embodiment, a program module 1310 (e.g., the program 140) may include an operating system (OS) to control resources associated with an electronic device (e.g., the electronic device 101), and/or diverse applications (e.g., the application program 147) driven on the OS. The OS may include, for example, Android™, iOS™, Windows™, Symbian™, Tizen™, or Bada™. Referring to FIG. 13, the program module 1310 may include a kernel 1320 (e.g., the kernel 141), a middleware 1330 (e.g., the middleware 143), an API 1360 (e.g., the API 145), and/or an application 1370 (e.g., the application program 147). At least a part of the program module 1310 may be preloaded on an electronic device or may be downloadable from an external electronic device (e.g., the electronic device 102 or 104, the server 106, or the like).

The kernel 1320 may include, for example, a system resource manager 1321 and/or a device driver 1323. The system resource manager 1321 may perform control, allocation, or retrieval of system resources. According to an embodiment, the system resource manager 1321 may include a process managing unit, a memory managing unit, or a file system managing unit. The device driver 1323 may include, for example, a display driver, a camera driver, a Bluetooth driver, a common memory driver, an USB driver, a keypad driver, a Wi-Fi driver, an audio driver, or an inter-process communication (IPC) driver. The middleware 1330 may provide, for example, a function which the application 1370 needs in common or may provide diverse functions to the application 1370 through the API 1360 to allow the application 1370 to use limited system resources of the electronic device. According to an embodiment, the middleware 1330 may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352.

The runtime library 1335 may include, for example, a library module, which is used by a compiler, to add a new function through a programming language while the application 1370 is being executed. The runtime library 1335 may perform input/output management, memory management, or processing of arithmetic functions. The application manager 1341 may manage, for example, the life cycle of the application 1370. The window manager 1342 may manage a GUI resource which is used in a screen. The multimedia manager 1343 may identify a format necessary to play media files, and may perform encoding or decoding of media files by using a codec suitable for the format. The resource manager 1344 may manage source code of the application 1370 or a space of a memory. For example, the power manager 1345 may manage the capacity of a battery or power and may provide power information that is needed to operate an electronic device. According to an embodiment, the power manager 1345 may operate in conjunction with a basic input/output system (BIOS). For example, the database manager 1346 may generate, search for, or modify a database which is to be used in the application 1370. The package manager 1347 may install or update an application which is distributed in the form of a package file.

The connectivity manager 1348 may manage, for example, wireless connection. The notification manager 1349 may provide a user with an event such as an arrival message, an appointment, or a proximity notification. The location manager 1350 may manage, for example, location information of an electronic device. The graphic manager 1351 may manage, for example, a graphic effect to be provided to a user or a user interface relevant thereto. The security manager 1352 may provide, for example, system security or user authentication. According to an embodiment, the middleware 1330 may include a telephony manager, which manages a voice or video call function of the electronic device, or a middleware module that combines functions of the above-described elements. According to an embodiment, the middleware 1330 may provide a module specialized to each OS kind. The middleware 1330 may remove a part of the preexisting elements, dynamically, or may add new elements thereto. The API 1360 may be, for example, a set of programming functions and may be provided with another configuration which is variable depending on an OS. For example, in the case where an OS is the android or iOS™, it may be permissible to provide one API set per platform. In the case where an OS is Tizen™, it may be permissible to provide two or more API sets per platform.

The application 1370 may include, for example, a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a watch 1384, health care (e.g., measuring an exercise quantity, blood sugar, or the like), or an application for offering environment information (e.g., atmospheric pressure, humidity, or temperature). According to an embodiment, the application 1370 may include an information exchanging application that supports information exchange between an electronic device and an external electronic device. The information exchanging application may include, for example, a notification relay application for transmitting specific information to the external electronic device, or a device management application for managing the external electronic device. For example, the notification relay application may send notification information, which is generated from other applications of an electronic device, to an external electronic device or may receive the notification information from the external electronic device and may provide a user with the notification information. The device management application may install, delete, or update, for example, a function (e.g., turn-on/turn-off of an external electronic device in itself (or a part of components) or adjustment of brightness (or resolution) of a display) of the external electronic device, which communicates with an electronic device, or an application running in the external electronic device. According to an embodiment, the application 1370 may include an application (e.g., a health care application of a mobile medical device) which is assigned in accordance with an attribute of the external electronic device. According to an embodiment, the application 1370 may include an application received from an external electronic device. At least a part of the program module 1310 may be implemented (e.g., performed) by software, firmware, hardware (e.g., the processor 120), or a combination of two or more thereof, and may include modules, programs, routines, sets of instructions, or processes for performing one or more functions.

According to various embodiments, an electronic device may include a camera module capturing an image, a sensor module recognizing a signal associated with the electronic device or an external object, a first display and a second display, each of which is configured to output content, a memory, and a processor electrically connected to the camera module, the first display, the second display, and the memory. The processor may be configured to determine whether the electronic device enters a first state, to capture a source image by using the camera module, when entering the first state, and to generate a first output image output on the first display or a second output image output on the second display based on the source image.

In an embodiment, the processor may be configured to determine a state where the electronic device is stopped, as the first state based on information collected through the sensor module. In another embodiment, the processor may be configured to determine the state where the electronic device is stopped, based on a measurement value of a gyro sensor or an acceleration sensor.

According to various embodiments, the processor may be configured to generate the first output image or the second output image based on a color or a pattern extracted from the source image. The processor may be configured to extract the color and the pattern from the central area of the source image. The processor may be configured to extract the color and the pattern from the entire pixels of the source image or sampled pixels.

According to various embodiments, the processor may be configured to determine the first state based on at least one of a movement speed of the electronic device or a distance between the electronic device and the external object, which is measured through the sensor module. The processor may be configured to determine a state where the movement speed is not greater than a first threshold value and the distance is not greater than a second threshold value, as the first state.

According to various embodiments, when the electronic device enters a second state, the processor may be configured to apply the first output image to the first display and to apply the second output image to the second display. The processor may be configured to determine a state where the electronic device is stopped, as the second state based on information collected through the sensor module.

According to various embodiments, the processor may be configured to apply a predetermined filter to capture the source image. When the electronic device enters the first state, the processor may be configured to capture a plurality of images and to determine at least part of a plurality of images as the source image.

In an embodiment, the processor may be configured to determine an internal image matched by searching for an image stored in the memory based on a feature point extracted from the source image and to generate the first output image and the second output image based on the source image and the determined internal image. In another embodiment, the processor may be configured to make a request for a matched external image to an external device based on a feature point extracted from the source image and to generate the first output image and the second output image based on the source image and the external image.

According to various embodiments, the processor may be configured to generate the first output image and the second output image based on a feature point extracted from the source image and to store the first output image and the second output image in the memory.

According to various embodiments, a screen outputting method performed by an electronic device may include determining whether the electronic device enters a first state, capturing a source image by using a camera module, when entering the first state, and generating a first output image output on a first display and a second output image output on a second display based on the source image.

In an embodiment, the determining of whether the electronic device enters the first state may include determining a state where the electronic device is stopped, as the first state based on information collected through a sensor module. In another embodiment, the determining of whether the electronic device enters the first state may include determining the first state based on at least one of a movement speed of the electronic device or a distance between the electronic device and an external object, which is measured through a sensor module.

According to various embodiments, the screen outputting method may further include applying the first output image and the second output image to the first display and the second display, respectively, when the electronic device enters a second state. The applying of the first output image and the second output image may include determining a state where the electronic device is stopped, as the second state based on information collected through the sensor module.

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed. According to various embodiments, at least a part of an apparatus (e.g., modules or functions thereof) or a method (e.g., operations) may be, for example, implemented by instructions stored in a computer-readable storage media (e.g., the memory 130) in the form of a program module. The instruction, when executed by a processor (e.g., a processor 120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter. According to various embodiments, a module or a program module may include at least one of the above components, or a part of the above components may be omitted, or other components may be further included. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. An electronic device comprising:
 a camera module configured to capture an image;
 a sensor module configured to recognize a signal associated with the electronic device or an external object;
 a first display and a second display, each of which is configured to output content;
 a memory; and
 a processor electrically connected to the camera module, the first display, the second display, and the memory,
 wherein the processor is configured to:
 determine whether the electronic device enters a first state based on information collected through the sensor module, wherein the first state where a distance from the external object is within a predetermined range;
 capture a source image by using the camera module, when entering the first state;
 determine an internal image matched by searching for an image stored in the memory based on a feature point extracted from the source image;
 generate a first output image for output on the first display and a second output image for output on the second display based on the source image and the determined internal image; and
 when the electronic device enters a second state, apply the first output image to the first display and the second output image to the second display, respectively, wherein the second state is a state where the electronic device is not moving.

2. The electronic device of claim 1, wherein the processor is configured to:
 determine the second state where the electronic device is not moving, based on a measurement value of a gyro sensor or an acceleration sensor.

3. The electronic device of claim 1, wherein the processor is configured to:
 generate the first output image and the second output image based on a color or a pattern extracted from the source image.

4. The electronic device of claim 1, wherein the processor is configured to:
 determine the first state based on at least one of a movement speed of the electronic device or a distance between the electronic device and the external object, which is measured through the sensor module.

5. The electronic device of claim 1, wherein the processor is configured to:
apply a predetermined filter to capture the source image.

6. The electronic device of claim 1, wherein the processor is configured to:
make a request for a matched external image to an external device based on a feature point extracted from the source image; and
change the first output image and the second output image based on the source image and the external image.

7. A screen outputting method performed by an electronic device, the method comprising:
determining whether the electronic device enters a first state based on information collected through a sensor module, wherein the first state is a state where a distance from an external object is within a predetermined range;
capturing a source image by using a camera module, when entering the first state;
determining an internal image matched by searching for an image stored in a memory based on a feature point extracted from the source image;
generating a first output image for output on a first display and a second output image for output on a second display based on the source image and the determined internal image; and
when the electronic device enters a second state, applying the first output image to the first display and the second output image to the second display, respectively, wherein the second state is a state where the electronic device is not moving.

* * * * *